Dec. 4, 1934.   V. W. KLIESRATH   1,982,815
CLUTCH CONTROL MECHANISM
Filed Oct. 10, 1931

INVENTOR.
VICTOR W. KLIESRATH
BY H. O. Clayton
ATTORNEY

Patented Dec. 4, 1934

1,982,815

UNITED STATES PATENT OFFICE 1,982,815

CLUTCH CONTROL MECHANISM

Victor W. Kliesrath, South Bend, Ind., assignor to Bendix Aviation Corporation, South Bend, Ind., a corporation of Delaware Application October 10, 1931, Serial No. 568,079

7 Claims. (Cl. 192—.01)

This invention relates to speed controlling mechanisms for an automotive vehicle, and particularly to means for operating the throttle and clutch.

The principal object of the invention is to improve upon the clutch controlling structure disclosed in the patent to Belcia, No. 1,470,272, dated October 9, 1923, wherein a vacuum operated fluid motor is operative to disengage the clutch when and if the accelerator pedal or throttle control is released, the control valve for the motor being actuated by the pedal. The patented structure, however, fails to provide means for controlling the rate of clutch engaging movement, this control being necessary by virtue of the varied modes of clutch engagement effected during the operation of the vehicle.

It is the principal object of the invention, therefore, to as nearly as possible simulate, in a power operated mechanism of this character, the conventional synchronized manual clutch and throttle control.

To the above end there is provided a throttling device, in series with the control valve of a fluid motor, operable by the heel of the operator, and conjointly with the toe operation of the throttle, for varying the rate of influx of air to the suction side of the motor and thereby vary, at the will of the driver, the rate of clutch plate movement.

Other objects of the invention and desirable details of construction and combinations of parts will become apparent from the following detailed description of a preferred embodiment of the invention taken in conjunction with the accompanying drawing, in which.

Figure 1:
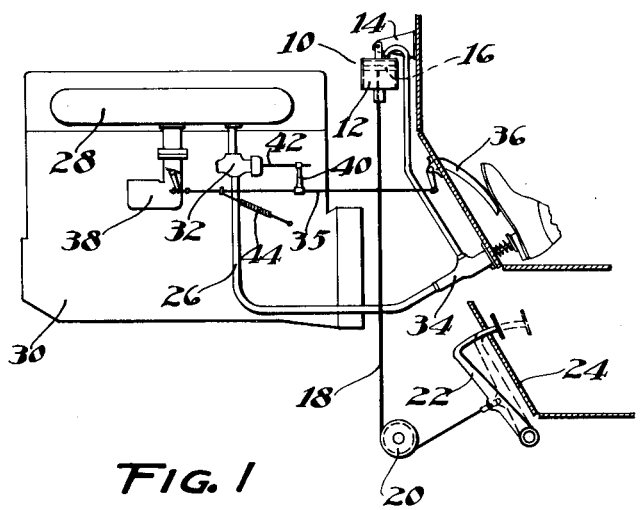
Figure 1 is a diagrammatic view of the control mechanism constituting the invention.

As disclosed diagrammatically in Figure 1 of the drawing, there is provided a single ended fluid motor 10, the casing 12 of which is preferably pivotally mounted on the dash at 14, a reciprocable piston 16 of said motor being connected, by a flexible connection 18, passed over a sheave 20, with the conventional clutch pedal 22 mounted beneath the floor board 24.

The motor is evacuated at closed throttle to disengage the clutch, a conduit 26 providing an air transmitting connection with the intake manifold 28 of the internal combustion engine 30. A three-way control valve 32 for the motor is interposed in the conduit as is a throttling valve mechanism 34, the latter to be described in detail hereinafter. The control valve 32 is opened, to intercommunicate the manifold and motor, by means of the engine throttle operating means, the throttle rod 35, connecting the accelerator pedal 36 with the carburetor 38, being connected at 40 with a flexible valve operating cable 42. At closed throttle the return spring 44 serves to move the valve piston 46 to the right, as disclosed in Figure 4, compressing valve spring 48 and registering ports 50 and 52, via recess 54 in the piston 46, to evacuate the motor and disengage the clutch, all as disclosed in Figures 1 and 4. The three-way control valve per se is not claimed herein, being the invention of Victor W. Kliesrath, covered by application No. 568,081, dated October 10, 1931. The aforementioned evacuation of the motor is effected by virtue of the evacuated condition of the intake manifold at closed throttle, this condition resulting from the pumping action of the engine pistons.

Figure 4:
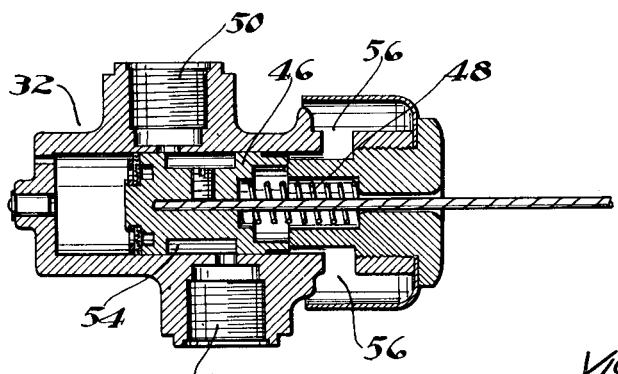
Figure 4 discloses, in longitudinal section, the three-way control valve of the clutch operating fluid motor.

Upon depressing the accelerator pedal 36 to speed up the engine the spring 44 is further tensioned to permit valve spring 48 to expand, moving the piston valve member 46 to the left, Figure 4, and register port 52 and atmospheric ports 56 to vent the motor to atmosphere and permit the clutch to engage.

The aforementioned construction is in a general way that of the aforementioned patent to Belcia.

The important feature of the present invention relates to means for varying the rate of clutch plate movement during its engaging operation, which means is operable at the will of the driver.

Figure 2:
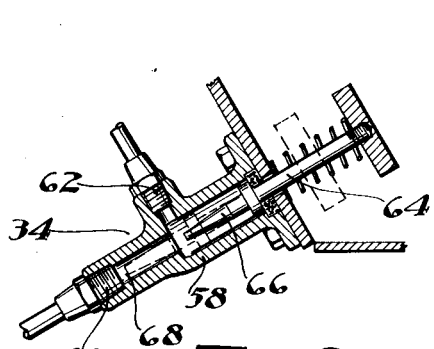
Figure 2 is a longitudinal sectional view of the manually operable throttling means.

To this end there is provided the aforementioned supplemental throttling valve 34, detailed in Figure 2, and positioned in series with the control valve 32 of the fluid motor 10. The valve 34 briefly comprises a casing 58 having outlet ports 60 and 62 for connection with the manifold 28 and fluid motor 10, respectively. The ports 60 and 62 are normally in communication with one another via the bore of the valve casing to thereby permit the normal operation of the motor, depending, of course, upon the size of the ports 60 and 62, bore of the conduit 26, etc. A predetermined rate of clutch engagement is thus had with this structure. It may be, however, that a slower rate of clutch engagement is desired, such for example, when the clutch plates are being engaged with the transmission in either low or reverse gear. To obtain this mode of clutch operation the driver depresses a spring pressed plunger 64 with his heel, the tapered end 66 of the plunger entering the lower end of the bore 68 of the casing, as disclosed in dotted lines in Figure 2. The degree of depression of the plunger, therefore, determines the size of the opening from the bore 68 which determines the rate of influx of air to the suction side of the motor; there thus results a definite rate of movement of the driving clutch plate. The tapered end 66 of the plunger 64 is preferably made of slightly less outside diameter than the inside diameter of the bore 68 of the casing to thereby obviate completely cutting out the power mechanism.

It will also be noted that the heel may depress the plunger 64 to the maximum extent when the accelerator is released and the clutch is disengaged. The heel may now be raised to vary the rate of clutch engagement as the toe is depressed to accelerate the engine; thus the relative timing of the throttle operation and clutch engagement may be varied to simulate the conventional synchronized manual operation of the throttle and clutch. The heel will probably remain depressed to the maximum extent of movement of the valve to engage the clutch in starting the vehicle, as indicated above, and will be progressively released to effect the clutching operation with the subsequent intermediate and high gear operations of the change speed transmission. The heel may be continuously released as the accelerator is depressed; however, the preferred mode of operation would be to depress the accelerator with a given setting of the heel.

Figure 3:
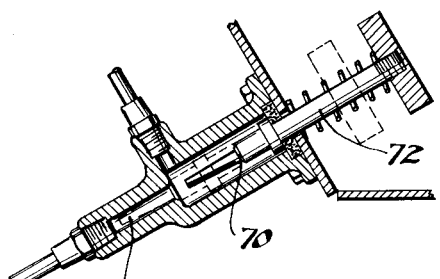
Figure 3 is a view similar to Figure 2 showing a slightly modified form of throttling device.

As disclosed in Figure 3, the tapered end 70 of a plunger 72 may be made to fit the bore 74 of the throttling valve to thereby provide a cut out device for the power clutch control mechanism.

There is thus provided a very simple means for varying, at the will of the driver, the rate of clutch plate movement during the engaging phase, or in other words predetermining the elapsed time in effecting the engagement of the clutch after the actuator control valve is closed or vented.

While one illustrative embodiment has been described, it is not my intention to limit the scope of the invention to that particular embodiment, or otherwise than by the terms of the appended claims.

I claim:

1. Control mechanism for an automotive vehicle provided with a throttle and a clutch comprising, in combination, power operated means for operating the clutch, said means comprising a fluid motor and a control valve therefor, manually operable means for opening the throttle, said throttle and clutch operating means including a manually operable pedal member in common and other manually operable means for varying the mode of clutch engagement, said last mentioned means and said pedal member being both operable by the foot of the operator.

2. Control mechanism for an automotive vehicle provided with a throttle and a clutch comprising, in combination, power operated means for operating the clutch, said means comprising a fluid motor and a control valve therefor, manually operable means for opening the throttle, said throttle and clutch operating means including a manually operable pedal member in common and a manually operable needle valve for varying the mode of clutch engagement, said needle valve and said pedal member being both operable by the foot of the operator.

3. Control mechanism for an automotive vehicle provided with a throttle and a clutch comprising, in combination, power operated means for operating the clutch, said means comprising a fluid motor and a control valve therefor, manually operable means for opening the throttle, said throttle and clutch operating means including a manually operable pedal member in common and a manually operable needle valve for varying the mode of clutch engagement, said needle valve and pedal member being operable by the heel and toe of the driver, respectively.

4. In a control mechanism for an automotive vehicle provided with a clutch, means for controlling the engagement and disengagement of the clutch comprising a fluid motor operatively connected to the clutch, a control valve for said motor and a needle valve operable by the heel of the driver for selectively determining either the rate of clutch engagement or progressively varying the rate of clutch engagement depending upon the mode of operation of said needle valve.

5. In a control mechanism for an automotive vehicle provided with a clutch, power means for operating said clutch, said means comprising a single ended fluid motor and a control valve therefor, and means operable by the heel of the driver for varying the rate of influx of air to the suction side of the motor to thereby determine the mode of clutch engagement.

6. In a control mechanism for an automotive vehicle provided with a clutch, vacuum operated power means for operating said clutch, said means comprising a single ended fluid motor and a control valve therefor, and a needle valve operable by the heel of the driver for varying the rate of influx of air to the suction side of the motor to thereby determine the mode of clutch engagement.

7. In a control mechanism for an automotive vehicle provided with a throttle and a clutch, power means for operating the clutch and manually operable means for operating the throttle, said means having a manually operable means in common, and other manually operable means cooperating with said aforementioned power means for controlling the mode of clutch engagement, one of said manually operable means being operable by the toe of the driver and the other of said means being operable by the heel of the driver.

VICTOR W. KLIESRATH.